(12) United States Patent
Mizutani et al.

(10) Patent No.: US 6,583,919 B1
(45) Date of Patent: Jun. 24, 2003

(54) ELECTROCHROMIC ANTI-GLARE MIRROR

(75) Inventors: Kenichi Mizutani, Aichi-ken (JP);
Narumi Ishigami, Aichi-ken (JP);
Masao Ayabe, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/577,990

(22) Filed: May 25, 2000

(30) Foreign Application Priority Data

Jun. 1, 1999 (JP) ............................. 11-153938

(51) Int. Cl.$^7$ .......................... G02F 1/155; G02F 1/153
(52) U.S. Cl. ...................... 359/266; 359/267; 359/273
(58) Field of Search ................................. 359/265, 267, 359/271, 272, 273, 601, 275, 266, 602, 603

(56) References Cited

U.S. PATENT DOCUMENTS

| | | | |
|---|---|---|---|
| 4,589,735 A | 5/1986 | Saunders | 349/175 |
| 5,504,478 A | 4/1996 | Knapp | 340/825.69 |
| 5,659,423 A * | 8/1997 | Schierbeek et al. | 359/604 |
| 5,820,245 A | 10/1998 | Desmond et al. | 362/494 |
| 6,000,823 A * | 12/1999 | Desmond et al. | 362/494 |
| 6,124,886 A * | 9/2000 | Deline et al. | 348/148 |
| 6,166,848 A * | 12/2000 | Cammenga et al. | 359/267 |
| 6,170,956 B1 * | 1/2001 | Rumsey et al. | 359/839 |
| 6,195,194 B1 * | 2/2001 | Roberts et al. | 359/267 |
| 6,244,716 B1 * | 6/2001 | Steenwyk et al. | 359/603 |
| 6,245,262 B1 * | 6/2001 | Varaprasad et al. | 264/1.31 |

\* cited by examiner

Primary Examiner—Hung Xuan Dang
Assistant Examiner—William Choi
(74) Attorney, Agent, or Firm—Nixon Peabody LLP; Thomas W. Cole

(57) ABSTRACT

An electrochromic anti-glare mirror is provided in which incorrect assembly can be prevented, assemblability can be improved, a number of work processes can be reduced, and costs can be reduced. The electrochromic anti-glare mirror includes an electrochromic layer which is provided at a rear surface side of a substrate glass, and in which an electrochromic film is nipped between a transparent conductive film and a reflective conductive film. By energizing the electrochromic film between the transparent conductive film and reflective conductive film, the electrochromic film is electrically made to color. Wires for electrochromic anti-glare for energizing the electrochromic film between the transparent conductive film and the reflective conductive film are printed on the printed circuit board. As a result, there is no need for complex work for installing and connecting cords as in conventional structures in which wires are cords. Therefore, incorrect assembly can be prevented, assemblability can be improved, the number of work processes can be reduced, costs can thereby be reduced.

24 Claims, 8 Drawing Sheets

ELECTROCHROMIC ANTI-GLARE MIRROR

BACKGROUND OF THE INVENTION

1. Field of the Invention

The present invention relates to an electrochromic anti-glare mirror in which color is electrically generated at an electrochromic film provided on a front surface side of a reflective film such that brightness of a reflected light can be adjusted.

2. Description of the Related Art

Among vehicle mirrors to be installed on a vehicle-,there are so-called electrochromic anti-glare mirrors in which an electrochromic film provided on a rear surface side of a substrate glass is made to color electrically such that the brightness of reflected light can be adjusted. In this electrochromic anti-glare mirror, for example, a transparent conductive film is provided on the rear surface of the substrate glass, and, on the rear surface of the transparent conductive film, an electrochromic film provided. On the rear surface of the electrochromic films a reflective conductive film made of aluminum or the like is provided. An electrochromic layer is formed by the transparent conductive film, electrochromic film, and the reflective conductive film. A protective plate made of glass, a metal, or the like is adhered by an adhesive for sealing to the rear surface of this electrochromic layer, and the electrochromic layer is protected by this protective plate.

The electrochromic anti-glare mirror has a pair of electrochromic anti-glare terminals. One of the electrochromic anti-glare terminals contacts the substrate glass and the transparent conductive film, whereas the other electrochromic anti-glare terminal contacts the substrate glass and the reflective conductive film. The wires, to this pair of the electrochromic anti-glare terminals, for energizing the electrochromic film between the transparent conductive film and the reflective conductive film are cords (These wires will be referred to hereinafter as "the wires for electrochromic anti-glare"). A pair of electrodes (referred to hereinafter as "electrochromic anti-glare electrodes") are connected to these wires for electrochromic anti-glare. By supplying electric power to the electrochromic film between the transparent conductive film and the reflective conductive film from these electrochromic anti-glare electrodes through the wires for electrochromic anti-glare, the electrochromic film between the transparent conductive film and the reflective conductive film is energized, and the electrochromic film is electrically made to color. In this way, the brightness of the light reflected by the electrochromic anti-glare mirror is adjusted.

Further, a fail-safe resistor is connected within the cord complete of the wires for electrochromic anti-glare. When there are problems with the power supply which supplies electric power to the electrochromic film between the transparent conductive film and the reflective conductive film, the fail-safe resistor discharges the electric charges of the electrochromic film between the transparent conductive film and the reflective conductive film. In this way, the fail-safe resistor does not allow the electrochromic film to color, and acts to forcibly return the electrochromic anti-glare mirror to a mode for day time.

Further, a heater is provided on the rear surface of the protective plate. A pair of heater terminals are provided at the heater, and the heater generates heat by being energized. The wires to the heater terminals (hereinafter referred to as the "wires for the heater") for energizing the heater are cords. A pair of electrodes (referred to as "the heater electrodes", hereinafter) are connected to the wires for the heater. By supplying electric power from this pair of heater electrodes to the heater through the wires, the heater is energized and generates heat. In this way, the heater heats the substrate glass and fog on the electrochromic anti-glare mirror is eliminated.

However, with such an electrochromic anti-glare mirror, because cords are used for the wires for electrochromic anti-glare and the wires for the heater, work involved in installing and connecting the cords is complex. As a result, it is easy for incorrect assembly to occur, assemblability is poor, and assembly involves many work steps. Therefore, the cost becomes high. Further, since these cords are attached by a butyl tape or the like to the rear surface of the heater, the electrochromic anti-glare mirror becomes thick and the space for accommodating the electrochromic anti-glare mirror becomes large. Moreover, since the cords move at the time of mirror adjustment, the cords are easily caught on other portions of the structure.

Further, since the resistor for fail-safe is wired within the cord complete of the wires for electrochromic anti-glare and a process of winding waterproof tape around this resistor for fail-safe is needed, the number of components and work processes increase, and as a result, the cost becomes high.

SUMMARY OF THE INVENTION

In view of the aforementioned, an object of the present invention is to obtain an electrochromic anti-glare mirror in which, by using a circuit board as the wiring for making an electrochromic film generate color electrically, incorrect assembly can be prevented and assemblability is improved, and, therefore, the number of the work processes decreases and the cost can be reduced.

An electrochromic anti-glare mirror according to the present invention includes an electrochromic anti-glare mirror for electrically altering reflectance when connected to a power supply, said mirror comprising: (a) a reflective film; (b) an electrochromic layer disposed on a front side of the reflective film, through which light reflected from the reflective film passes, and whose color changes due to the electrochromic layer being energized; and (c) a circuit board having a conductor with two ends, one end being connected to the electrochromic layer and the other end being for connection to a power supply.

In accordance with the electrochromic anti-glare mirror of the present invention, a conductor for energizing an electrochromic film is provided on a circuit board, and electric power is supplied to the electrochromic film through the conductor. The electrochromic film is thereby energized and made to color electrically. In this way, brightness of light reflected by the electrochromic anti-glare mirror is adjusted.

Here, since the conductor is provided at the circuit board, there is no need for complicated work for installing and connecting cords as there is in the conventional structure in which the wires are cords. Therefore, not only can incorrect assembly be prevented, but also, assemblability can be improved and the number of work processes can be reduced, thereby reducing costs. Further, since the conductor can be made thin, the electrochromic anti-glare mirror can be made thinner and requires less space. Moreover, since the conductor is fixed to the circuit board by printing or the like, catching of the wire for electrochromic anti-glare on the other portions of the structure at the time of mirror adjustment can be suppressed.

It should be noted that, although a transparent substrate is provided in front of the electrochromic layer, the material of this transparent substrate is not limited to glass, and plastic may be used for example. Moreover, the technique for providing the conductor on the circuit board may be any technique such as printing, etching, adhesion, or the like. Further, the reflective film may be provided separately from the electrochromic layer.

DESCRIPTION OF THE PREFERRED EMBODIMENTS

Figure 1:
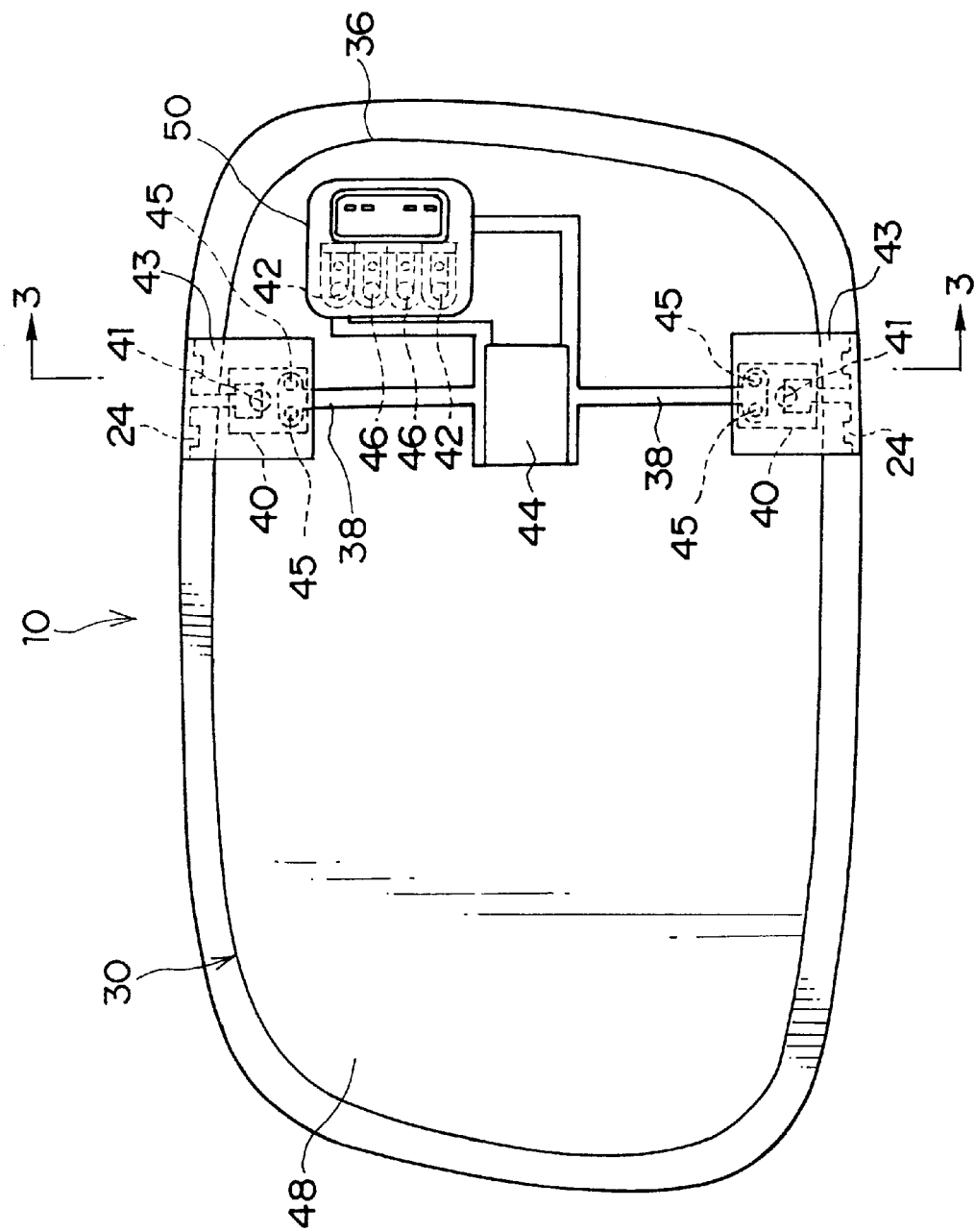
FIG. 1 is a rear view illustrating a main portion of an electrochromic anti-glare mirror which relates to an embodiment of the present invention.
Figure 2:
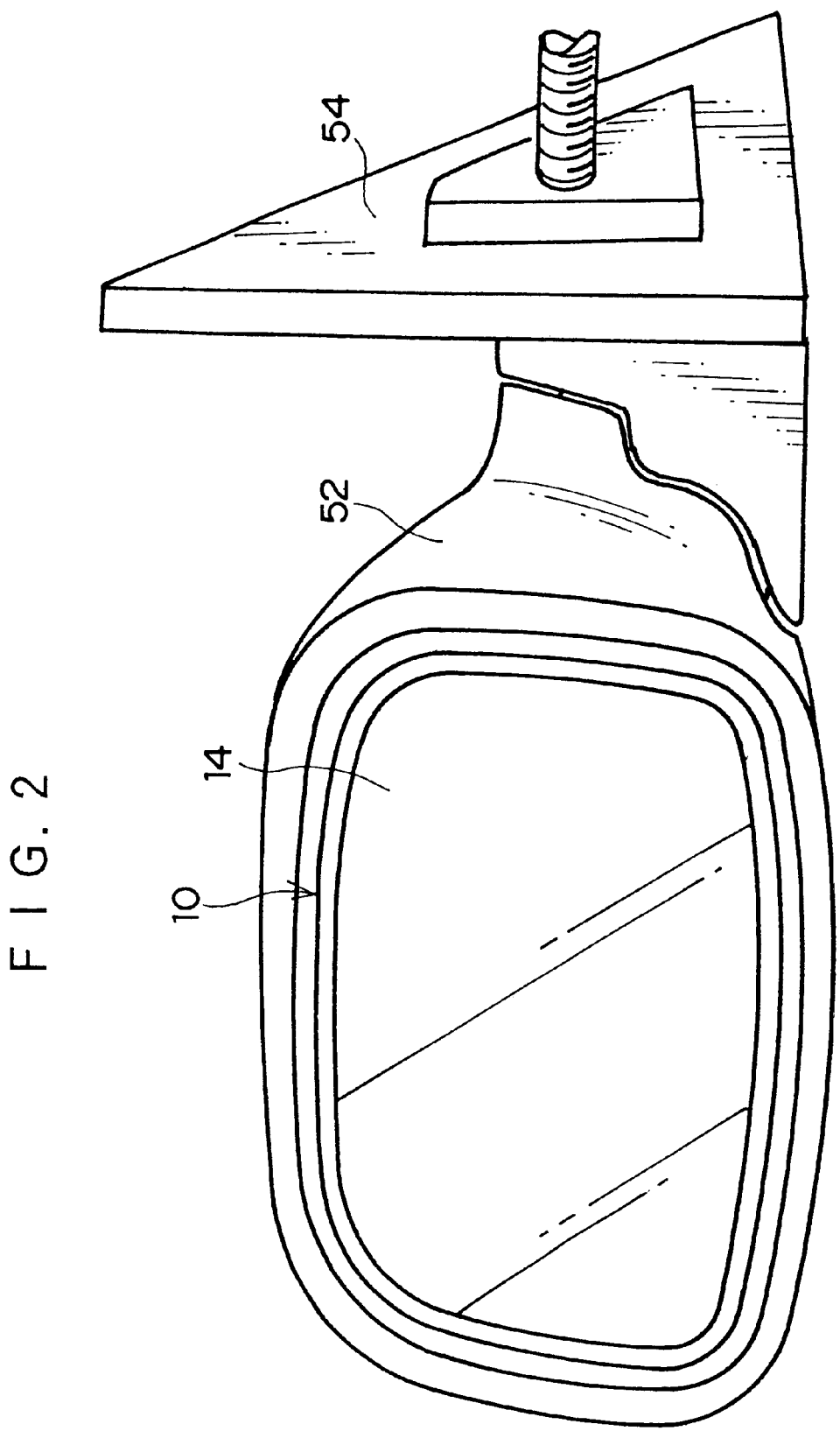
FIG. 2 is a front view illustrating the exterior of the electrochromic anti-glare mirror.

In FIG. 1, a main portion of an electrochromic anti-glare mirror 10 which relates to an embodiment of the present invention is illustrated in rear view, and in FIG. 2, the exterior of the electrochromic anti-glare mirror 10 is illustrated in front view. Moreover, in FIG. 3, the schematic structure of the electrochromic anti-glare mirror 10 is illustrated in a cross-sectional view, and in FIG. 4, a structure of the main portion of the electrochromic anti-glare mirror 10 is illustrated in an exploded perspective view. Arrows FR in the drawings indicate "front" of the mirror and arrows RE indicate "rear" of the mirror (rear surface). External light enters into the electrochromic anti-glare mirror 10 in a direction opposite to the direction of arrow FR and is reflected in the direction of arrow FR.

Figure 3A:
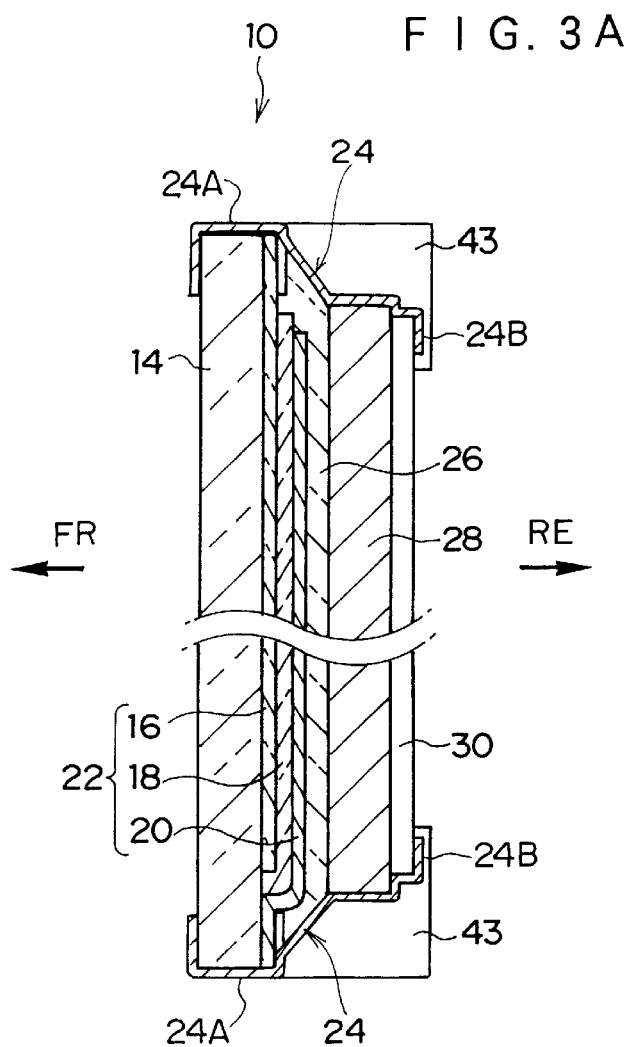
FIG. 3A is a cross-sectional view illustrating a schematic structure of the electrochromic anti-glare mirror taken along line 3—3 in FIG. 1.
Figure 3B:
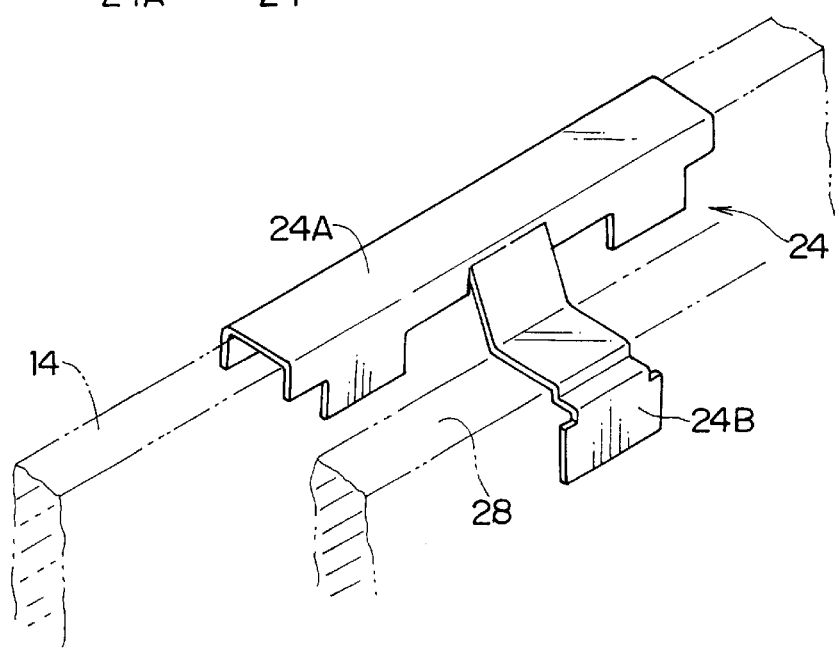
FIG. 3B is a perspective view illustrating electrochromic anti-glare terminals.

As illustrated in FIG. 3, the electrochromic anti-glare mirror 10 has a substrate glass 14. On the rear surface (RE direction surface) of the substrate glass 14, a transparent conductive film 16 is provided, and on the rear surface of the transparent conductive film 16, an electrochromic film 18 is provided. Moreover, on the rear surface of the electrochromic film 18, a reflective conductive film 20 formed of aluminum or the like is provided. An electrochromic layer 22 is formed by the transparent conductive film 16, the electrochromic film 18, and the reflective conductive film 20. Here, at the top portion and the bottom portion of the substrate glass 14 and the electrochromic layer 22, a pair of terminals (referred to as "electrochromic anti-glare terminals 24", hereinafter) are provided. The electrochromic anti-glare terminal 24 at the top side contacts the substrate glass 14 and the transparent conductive film 16, and the electrochromic anti-glare terminal 24 at the bottom side contacts the substrate glass 14 and the reflective conductive film 20. As illustrated in FIG. 3B, the electrochromic anti-glare terminals 24 are each formed from a thin metal plate such as a copper plate. One end of the electrochromic anti-glare terminal 24 is bent into a substantial U-shape to form a grasping portion 24A. As illustrated in FIG. 3A, at the upper portion of the substrate glass 14, the grasping portion 24A nips the transparent conductive film 16 and the substrate glass 14, whereas at the bottom portion of the substrate glass 14, the grasping portion 24A nips the reflective conductive film 20 and the substrate glass 14. By supplying electric power to the electrochromic film 18 between the transparent conductive film 16 and the reflective conductive film 20 through this pair of electrochromic anti-glare terminals 24, the electrochromic film 18 between the transparent conductive film 16 and the reflective conductive film 20 is energized, and the electrochromic film 18 is electrically made to color. In this way, the brightness of the reflected light reflected by the electrochromic anti-glare mirror 10 is adjusted.

The rear surface side of the electrochromic layer 22, including leg portions 24B, is sealed with an adhesive for sealing 26. Further, a protective plate 28 made of glass, a metal, or the like is adhered to the rear surface side of the electrochromic layer 22 by the adhesive for sealing 26. The electrochromic layer 22 is protected by the protective plate 28.

Figure 4:
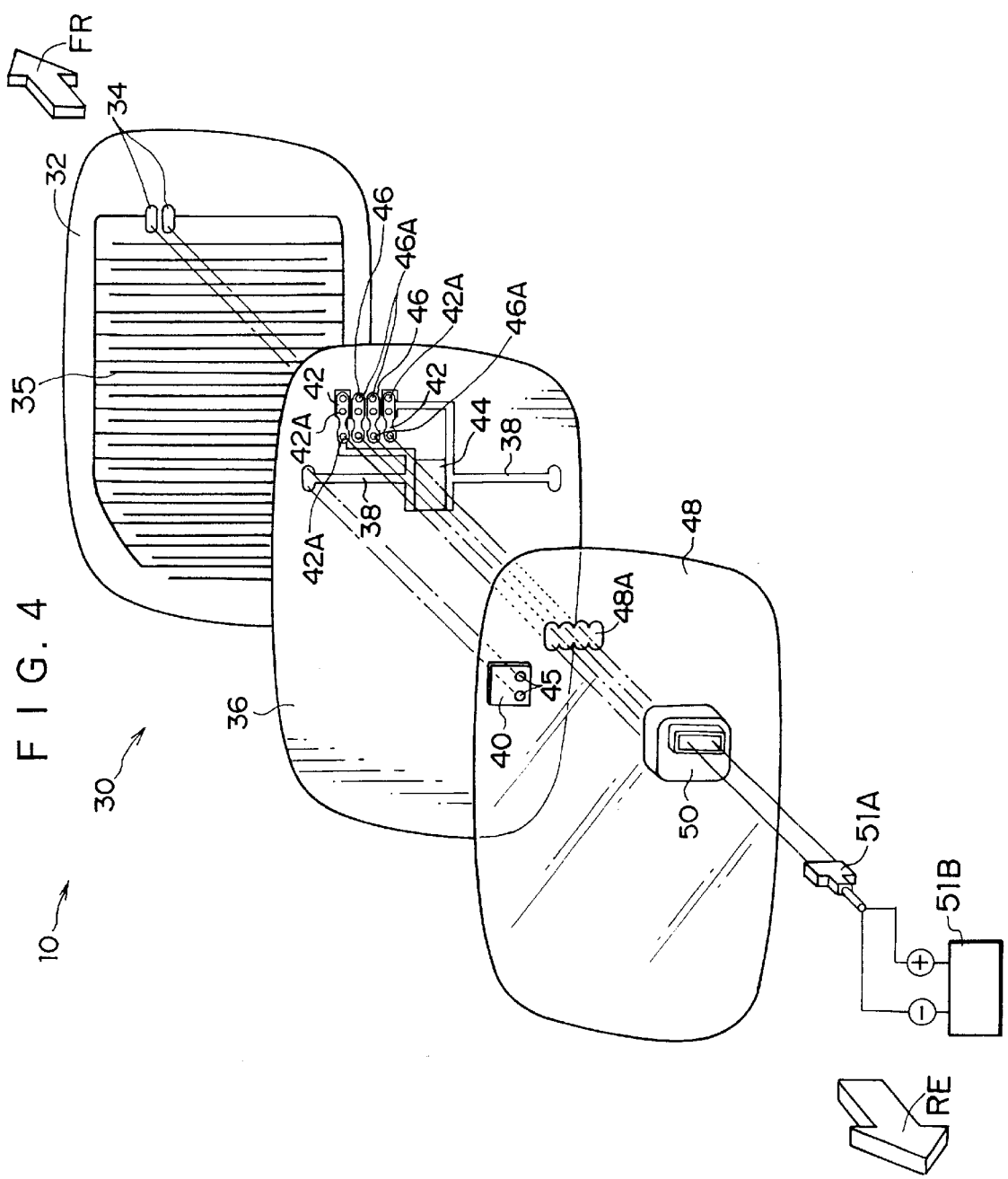
FIG. 4 is an exploded perspective view illustrating a main portion of the electrochromic anti-glare mirror.

On the rear surface of the protective plate 28, a sheet member 30 is provided. The sheet member 30 includes a plate-shaped heater 32 at a position where the sheet member 30 contacts the rear surface of the protective plate 28. As illustrated in FIG. 4, a pair of terminals whose polarities are different from each other (referred to as "heater terminals 34", hereinafter) and a heating element 35 are provided at the heater 32, and the heating element 35 extends over substantially the entire surface of the heater 32. The entire surface of the heater 32 is coated with a protective film which is not shown, and the heating element 35 generates heat by being energized. In this way, the heater 32 heats the substrate glass 14 and fog on the electrochromic anti-glare mirror 10 is eliminated.

On the rear surface of the heater 32, a printed circuit board 36 which is thin and flexible is provided. As illustrated in FIG. 1 and FIG. 4, on the printed circuit board 36, wires (referred to as "wires for electrochromic anti-glare 38" hereinafter), which are narrow, thin conductors and which are for energizing the electrochromic film 18 between the transparent conductive film 16 and reflective conductive film 20 of the electrochromic layer 22, are printed on the printed circuit board 36.

Further, a pair of electrodes (referred to as "electrochromic anti-glare electrodes 42" hereinafter) is provided on the printed circuit board 36. These electrochromic anti-glare electrodes 42 are fixed to the printed circuit board 36 by rivets 42A which pass through the printed circuit board 36. This pair of electrochromic anti-glare electrodes 42 have polarities which are different from each other, and each is connected to a wire for electrochromic anti-glare 38. Electric power is supplied from the pair of electrochromic anti-glare electrodes 42 to the pair of electrochromic anti-glare terminals 24 through the wires for electrochromic anti-glare 38.

Further, a resistor for fail-safe 44 is printed on the printed circuit board 36. The resistor for fail-safe 44 is wired between the wires for electrochromic anti-glare 38. The resistor for fail-safe 44 discharges the electric charges generated at the electrochromic film 18 between the transparent conductive film 16 and the reflective conductive film 20, when there are problems with a power supply which will be described later and which supplies electric power to the electrochromic film 18 between the transparent conductive film 16 and the reflective conductive film 20 in the electrochromic layer 22. In this way, the resistor for fail-safe 44 sets the electrochromic film 18 in a state in which color cannot be generated, and acts to forcibly return the electrochromic anti-glare mirror 10 to a daytime mode.

In the same way as the electrochromic anti-glare electrodes 42, heater electrodes 46 are fixed to the printed circuit board 36 by rivets 46A. The rivets 46A are exposed at the front and rear surfaces of the printed circuit board 36. Since the heater 32 and the printed circuit board 36 are disposed in a superposed manner, the pair of heater terminals 34 of the heater 32 contact the pair of heater electrodes 46 of the printed circuit board 36, via the rivets 46A. The pair of heater electrodes 46 and the pair of electrochromic anti-glare electrodes 42 are disposed so as to extend longitudinally in a horizontal direction as illustrated in FIG. 4 and are disposed adjacent and parallel to each other.

Figure 5:
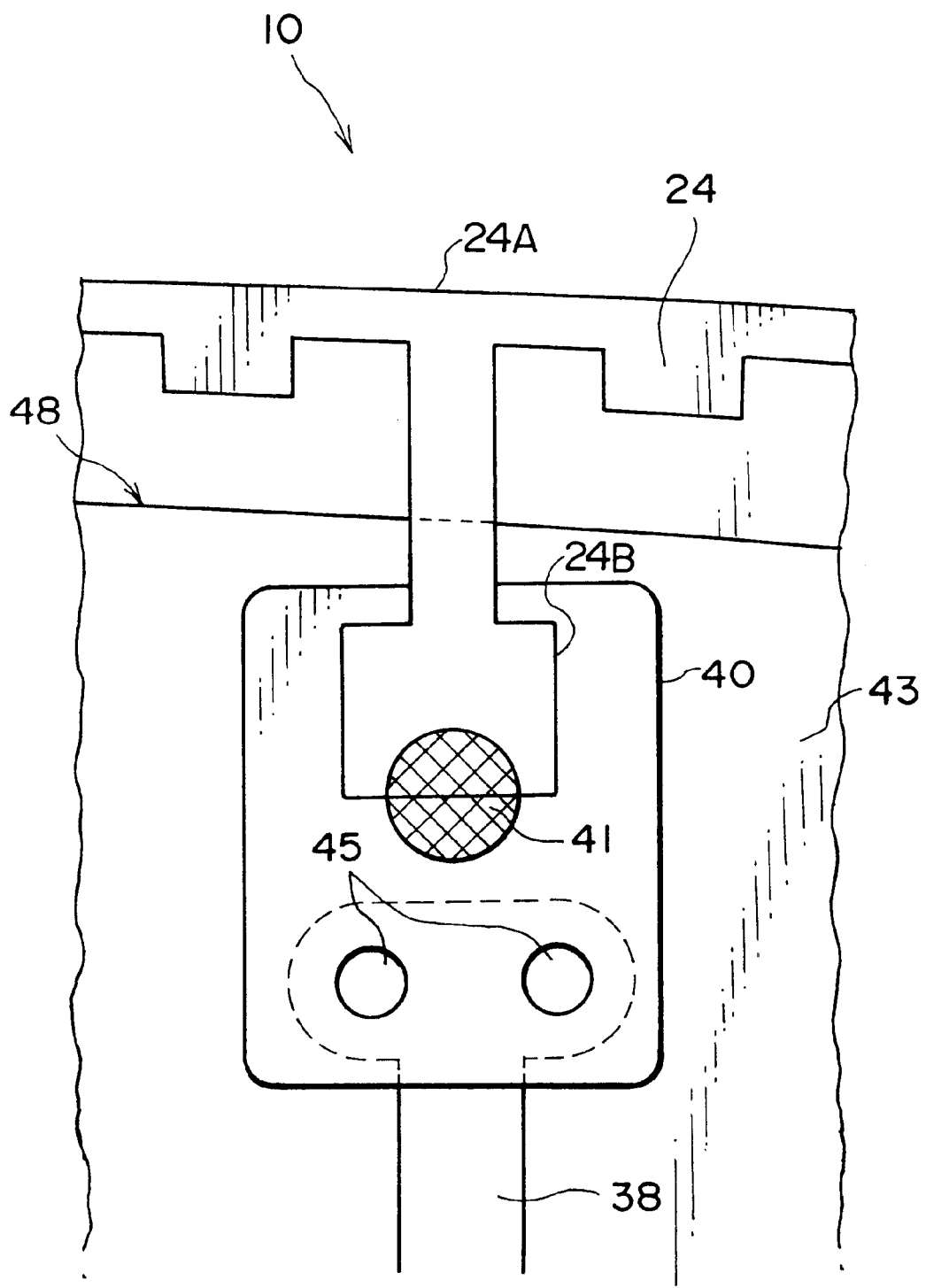
FIG. 5 is a rear view illustrating connecting portion which connects an electrochromic anti-glare terminal of the electrochromic anti-glare mirror and a wire for electrochromic anti-glare.

As illustrated in FIG. 4, a cover sheet 48 is affixed to the rear surface of the printed circuit board 36, and the printed circuit board 36 is protected by the cover sheet 48. The pair of heater electrodes 46 and the pair of electrochromic anti-glare electrodes 42 are exposed from holes 48A provided at the cover sheet 48. Further, a pair of copper alloy plates 40 are provided on the rear surface side of the cover sheet 48. As illustrated in detail in FIGS. 4 and 5, the copper alloy plates 40 are fixed to the cover sheet 48 by rivets 45 which pass through the cover sheet 48. Accordingly, the portions of the rivets 45 exposed at the front surface of the cover sheet 48 are connected to final end portions (electrochromic anti-glare terminal 24 side end portions) of the wires for electrochromic anti-glare 38 of the printed circuit board 36. Further, the copper alloy plates 40 are connected to the leg portions 24B of the electrochromic anti-glare terminals 24 through welded portions 41, formed by junction soldering, spot welding, ultrasonic welding, or the like. In this way, the pair of electrochromic anti-glare terminals 24 are connected to the wires for electrochromic anti-glare 38. Further, the end portions of the wires for electrochromic anti-glare 38, the copper alloys 40, the rivets 45, and the welded portions 41 are sealed by sealing members such as silicon, butyl tape, or the like.

A 4-pole male connector 50 is mounted to the rear surface of the cover sheet 48 and is connected to the pair of heater electrodes 46 and the pair of electrochromic anti-glare electrodes 42. The 4-pole male connector 50 is connected to a vehicle power supply 51B via a 4-pole female connector 51A and a cord complete (not shown). In this way, through the cord complete, the 4-pole female connector 51A, and the 4-pole male connector 50, electric power is supplied from the power supply 51B to each of the pair of heater electrodes 46 and the pair of electrochromic anti-glare electrodes 42.

As illustrated in FIG. 2, the electrochromic anti-glare mirror 10 is accommodated in a visor 52 which is a base, and the visor 52 is supported by a stay 54 at the vehicle body, e.g., at a door of the vehicle body.

Next, operation of the present embodiment will be described.

In the electrochromic anti-glare mirror 10 having the above-described structure, through the cord complete, the 4-pole female connector 51A, and the 4-pole male connector 50, electric power is supplied from the power supply 51B to the heater electrodes 46 and the electrochromic anti-glare electrodes 42 provided at the printed circuit board 36.

When electric power is supplied to the pair of electrochromic anti-glare electrodes 42, electric power is supplied to the pair of electrochromic anti-glare terminals 24 through the wires for electrochromic anti-glare 38 printed on the printed circuit board 36. As a result, electric power is supplied through the pair of electrochromic anti-glare terminals 24 to the electrochromic film 18 between the transparent conductive film 16 and the reflective conductive film 20 in the electrochromic layer 22, and the electrochromic film 18 between the transparent conductive film 16 and the reflective conductive film 20 is energized, and is electrically made to color. In this way, the brightness of the reflected light reflected by the electrochromic anti-glare mirror 10 is adjusted.

Here, since the wires for electrochromic anti-glare 38 are printed on the printed circuit board 36, there is no need for complex work for installing and connecting the cords as there is in conventional wiring using cords. Thus, not only can incorrect assembly be prevented, but also assemblability can be improved and the number of work processes can be reduced, and costs can thereby be reduced. Moreover, since the wires for electrochromic anti-glare 38 are printed on the printed circuit board 36, the electrochromic anti-glare mirror 10 can be made thinner and requires less space. Further, since the wires for electrochromic anti-glare 38 are printed on the printed circuit board 36 and do not move, catching of the wires for electrochromic anti-glare 38 on the other portions of the structure at the time of mirror adjustment can be suppressed.

Further, the resistor for fail-safe 44 printed on the printed circuit board 36 discharges electric charges of the electrochromic film 18 between the transparent conductive film 16 and the reflective conductive film 20, when there are problems with the power supply 51B which supplies electric power to the electrochromic film 18 between the transparent conductive film 16 and the reflective conductive film 20 of the electrochromic layer 22. In this way, the resistor for fail-safe 44 sets the electrochromic film 18 in a state in which color cannot be generated, and acts to forcibly return the electrochromic anti-glare mirror 10 to a daytime mode.

Here, since the resistor for fail-safe 44 is printed on the printed circuit board 36, it is not necessary to wire a resistor for fail-safe within a cord complete of the wiring for electrochromic anti-glare as performed conventionally. Moreover, a process for winding a waterproof tape around the resistor for fail-safe becomes unnecessary. Thus, the number of parts and the number of work processes are decreased and costs can be reduced.

On the other hand, when electric power is supplied to the pair of heater electrodes 46, electric power is supplied from the pair of heater electrodes 46 to the pair of heater terminals 34. In this way, the heater 32 is energized and generates heat. The heater 32 thereby heats the substrate glass 14 so that fog on the electrochromic anti-glare mirror 10 is eliminated.

Here, cords which conventionally connect a heater terminal with an electrochromic anti-glare terminal are no longer needed. As a result, there is no need for complex work for installing and connecting the cords as there is conventionally. Not only can incorrect assembly be prevented, but also, assemblability can be improved and the number of work processes can be reduced, thereby reducing costs. Accordingly, the electrochromic anti-glare mirror 10 can be made thinner and requires less space, and the catching of cords on the other portions of the structure at the time of mirror adjustment can be suppressed.

Further, in the present embodiment, the pair of heater electrodes 46 provided at the printed circuit board 36 are made to contact the pair of heater terminals 34 which are directly connected to the plate-shaped heater 32. The present invention is not limited to the same. A wiring which connects the pair of the heater electrodes 46 provided at the printed circuit board 36 to the pair of heater terminals 34 directly connected to the plate-shaped heater 32, may be printed on the printed circuit board 36. In this way, effects which are the same as those of the above-described embodiment can be obtained.

Second Embodiment

Figure 6:
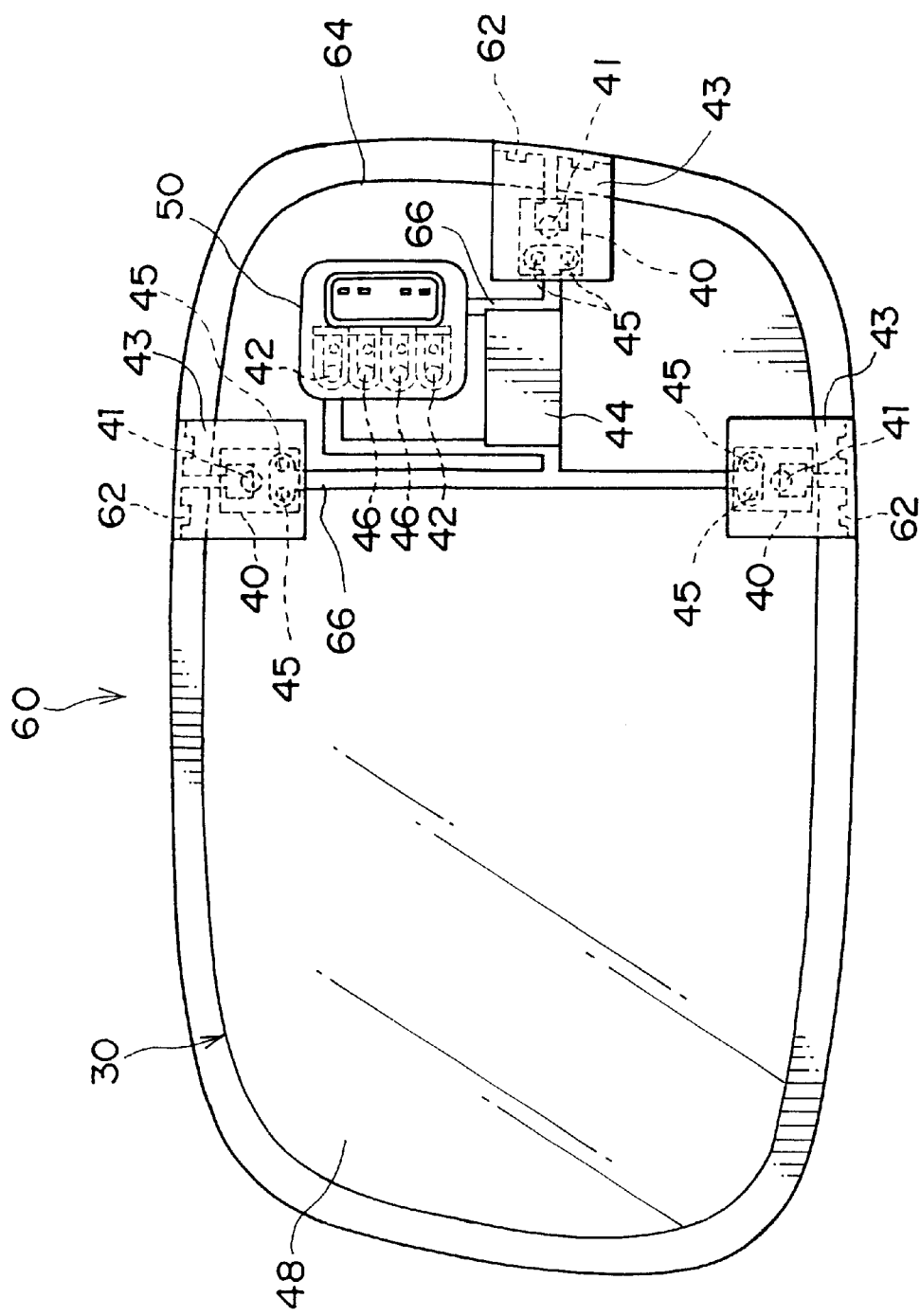
FIG. 6 is a rear view illustrating a main portion of an electrochromic anti-glare mirror which relates to a second embodiment of the present invention.

In FIG. 6, a main portion of an electrochromic anti-glare mirror 60 relating to the second embodiment is illustrated in rear view.

As illustrated in FIG. 6, in the electrochromic anti-glare mirror 60 relating to the present second embodiment, an electrochromic anti-glare terminal 62 is provided at each of a top portion, a bottom portion and a side portion of the substrate glass 14 and the electrochromic layer 22 (see FIGS. 1–4) which have the same structures as in the previously-described embodiment. The electrochromic anti-glare terminal 62 at the side portion contacts the substrate glass 14 and the transparent conductive film 16, and the electrochromic anti-glare terminals 62 at the top portion and bottom portion abut the substrate glass 14 and the reflective conductive film 20. Accordingly, in the present embodiment, it is possible to electrically generate color more uniformly. Further, wires for electrochromic anti-glare 66 are printed on a printed circuit board 64. The wires for electrochromic anti-glare 66 are connected to the three electrochromic anti-glare terminals 62 in a manner which is the same as in the first embodiment described above. Other structures have the same structures and effects as those of the first embodiment.

Here, even in a case in which three electrochromic terminals 62 are provided as in the present second embodiment, the wires for electrochromic anti-glare 66 are printed on the printed circuit board 64. As a result, there is no need for a complex operation for installing and connecting cords as there is in the conventional structure in which the wires are cords. Therefore, not only can incorrect assembly be prevented, but also, assemblability can be improved and the number of work processes can be reduced, thereby reducing costs. Further, since the wires for electrochromic anti-glare 66 are printed on the printed circuit board 64, the electrochromic anti-glare mirror 60 can be made thinner and takes up less space. Further, since the wires for electrochromic anti-glare 66 are printed on the printed circuit board 64 and do not move, the catching of the wires for electrochromic anti-glare 66 on the other portions of the structure at the time of mirror adjustment can be suppressed.

Further, since the resistor for fail-safe 44 is printed on the printed circuit board 64, it is not necessary to wire a resistor for fail-safe within a cord complete of the wiring for electrochromic anti-glare as performed conventionally. Moreover, a process for winding a waterproof tape around the resistor for fail-safe becomes unnecessary. Thus, the number of parts and the number of work processes are decreased and costs can be reduced.

Moreover, cords which conventionally connect a heater terminal and an electrochromic anti-glare terminal are no longer needed. As a result, there is no need for complicated work for installing and connecting the cords as there is conventionally. Not only can incorrect assembly be prevented, but also, assemblability can be improved and the number of work processes can be reduced, thereby reducing costs. Further, accordingly, the electrochromic anti-glare mirror 60 can be made thinner and requires less space, and catching of the cords at the time of mirror adjustment can be suppressed.

Third Embodiment

Figure 7:
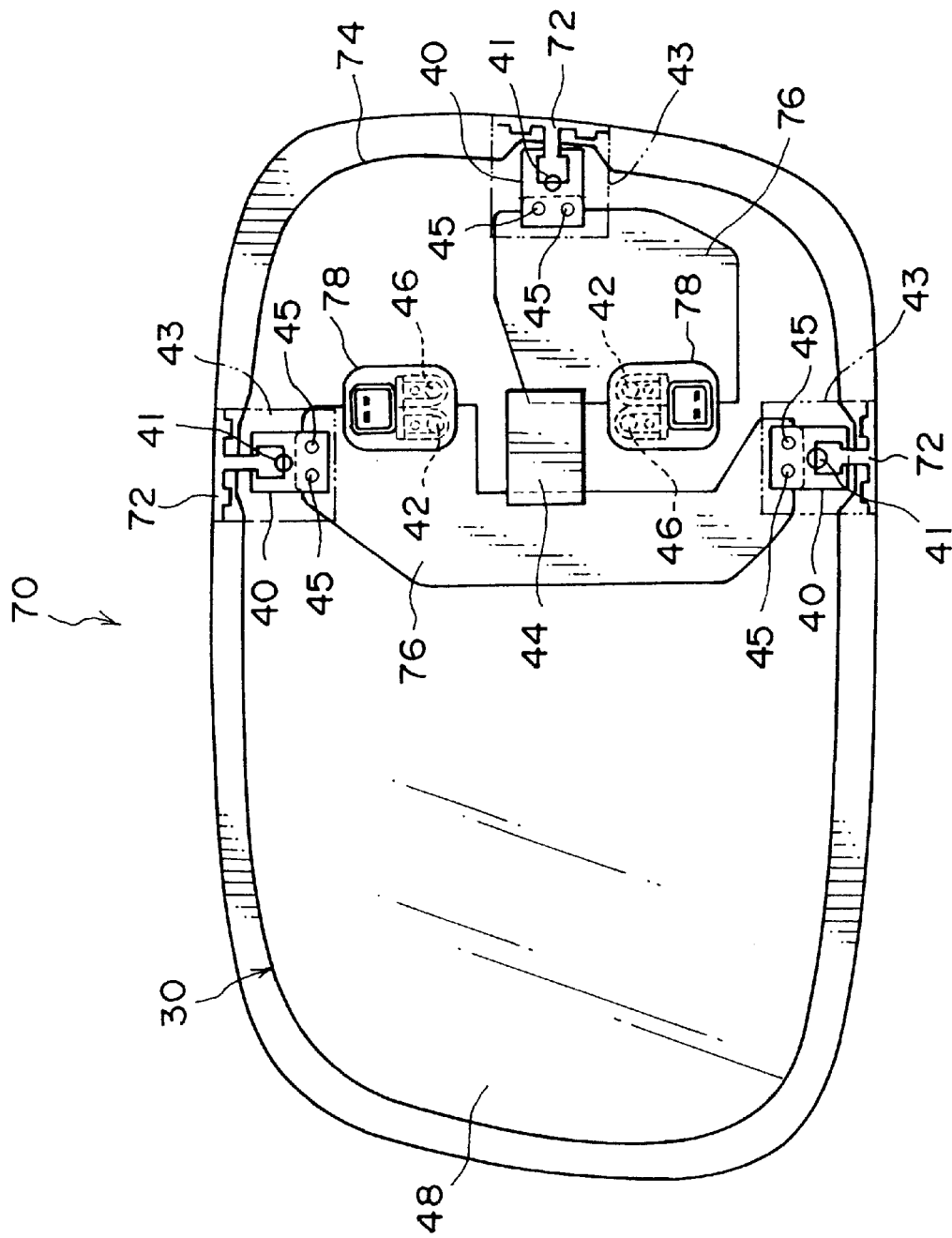
FIG. 7 is a rear view illustrating a main portion of an electrochromic anti-glare mirror which relates to a third embodiment of the present invention.
Figure 8:
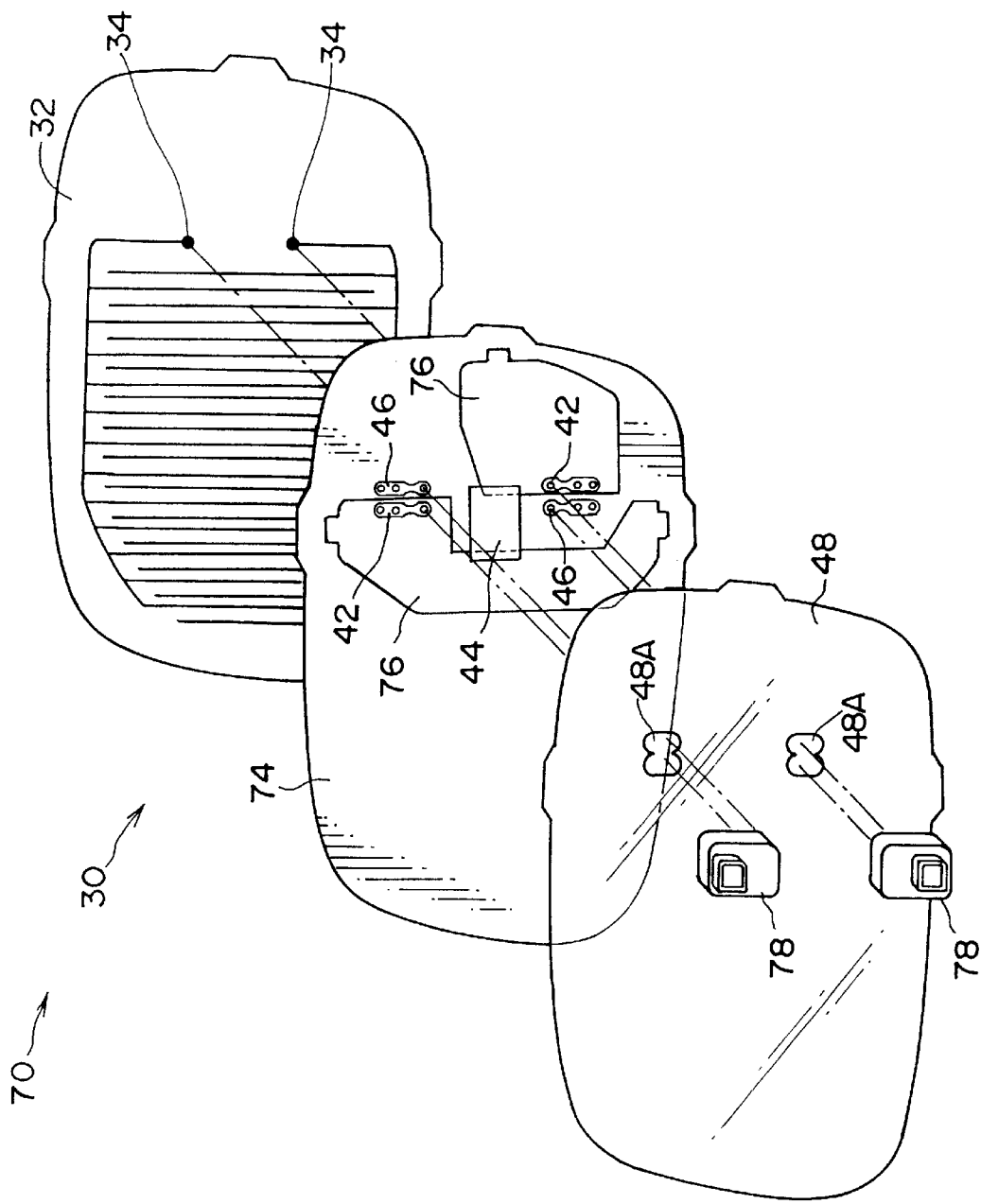
FIG. 8 is an exploded perspective view illustrating a main portion of the electrochromic anti-glare mirror which relates to the third embodiment of the present invention.

In FIG. 7, a main portion of an electrochromic anti-glare mirror 70 which relates to the third embodiment is illustrated in rear view. In FIG. 8, the main portion of the electrochromic anti-glare mirror 70 is illustrated in an exploded perspective view.

In the electrochromic anti-glare mirror 70 relating to the present embodiment, an electrochromic anti-glare terminals 72 is provided at each of the top portion, the bottom portion, and the side portion of the substrate glass 14 and the electrochromic layer 22 which have the same structures as in the previously-described embodiments. The electrochromic anti-glare terminal 72 at the side portion contacts the substrate glass 14 and the transparent conductive film 16, whereas the electrochromic anti-glare terminals 72 at the top portion and bottom portion contact the substrate glass 14 and the reflective conductive film 20. Accordingly, in the present third embodiment, the electrochromic film 18 can be electrically made to color more uniformly.

Moreover, wide, thin, plate-shaped conductors for electrochromic anti-glare 76 are printed on a printed circuit board 74. The conductors for electrochromic anti-glare 76 are connected to the three electrochromic anti-glare terminals 72 in a manner similar to that of the first embodiment described above. The conductors for electrochromic anti-glare 76 are connected to the pair of electrochromic anti-glare electrodes 42. Electric power is supplied to the electrochromic anti-glare terminals 72 from the pair of electrochromic anti-glare electrodes 42 via the conductors for electrochromic anti-glare 76. Further, the pair of electrochromic anti-glare electrodes 42 are disposed separately at the upper portion and the lower portion of the printed circuit board 74. Moreover, the resistor for fail-safe 44 is wired between the conductors for electrochromic anti-glare 76.

The pair of heater electrodes 46 which supply electric power the pair of heater terminals 34 are disposed separately at the upper portion and the lower portion of the printed circuit board 74. Accordingly, one of the heater electrodes 46 and one of the electrochromic anti-glare electrodes 42 form a set, and one of these sets of a heater electrode 46 and an electrochromic anti-glare electrode 42 is provided at each of the upper portion and the lower portion of the printed circuit board 74. Further, in the same way as in FIG. 4, the heater electrodes 46 and the electrochromic anti-glare electrodes 42 are exposed from the holes 48A in the cover sheet 48.

A pair of 2-pole male connectors 78 that have polarities different from each other are mounted on the rear surface of the cover sheet 48. The 2-pole male connectors 78 are connected to the respective sets of the heater electrode 46 and the electrochromic anti-glare electrode 42 which are disposed at the upper portion and the lower portion of the printed circuit board 74. The 2-pole male connectors 78 are connected to a cord complete (not shown) through 2-pole female connectors (also not shown). The cord complete is connected to a power supply (not shown). In this way, electric power is supplied from the power source to the pair of heater electrodes 46 and the pair of electrochromic anti-glare electrodes 42 through the cord complete, the 2-pole female connectors, and the 2-pole male connectors 78.

Here, even in a case in which three electrochromic anti-glare terminals 72 are provided as described in the present third embodiment, since the conductors for electrochromic anti-glare 76 are printed on the printed circuit board 74, there is no need for complicated work for installing and connecting cords as there is in the conventional structure in which the wires are cords. Therefore, not only can incorrect assembly be prevented, but also, assemblability can be improved and the number of work processes can be reduced, thereby reducing costs. Further, since the conductors for electrochromic anti-glare 76 are printed on the printed circuit board 74, the electrochromic anti-glare mirror 70 can be made thinner and requires less space. Moreover, since the conductors for electrochromic anti-glare 76 are printed on the printed circuit board 74 and do not moves, catching of the conductors for electrochromic anti-glare 76 on the other portions of the structure at the time of mirror adjustment can be suppressed.

Further, since the resistor for fail-safe 44 is printed on the printed circuit board 74, it is not necessary to wire a resistor for fail-safe within a cord complete of the wiring for electrochromic anti-glare as performed conventionally. Moreover, a process for winding a waterproof tape around the resistor for fail-safe becomes unnecessary. Thus, the number of parts and the number of work processes are decreased and costs can be reduced.

Moreover, cords which conventionally connect a heater terminal and an electrochromic anti-glare terminal are no longer needed. As a result, there is no need for complicated work for installing and connecting the cords as there is conventionally. Not only can incorrect assembly be prevented, but also, assemblability can be improved and the number of work processes can be reduced, thereby reducing costs. Further, accordingly, the electrochromic anti-glare mirror 70 can be made thinner and requires less space, and catching of the cords at the time of mirror adjustment can be suppressed.

What is claimed is:

1. An electrochromic anti-glare mirror for electrically altering reflectance when connected to a power supply, said mirror comprising:
   (a) a reflective film;
   (b) an electrochromic layer disposed on a front side of the reflective film, through which light reflected from the reflective film passes, and whose color changes due to the electrochromic layer being energized; and
   (c) a circuit board having a conductor with two ends, one end being connected to the electrochromic layer and the other end being for connection to a power supply, wherein said reflective film, said electrochromic layer and said circuit board are disposed in direct or indirect close contact with each other,
   wherein the electrochromic layer is formed by a pair of conductive films consisting of a front transparent conductive film and a rear conductive film, and an electrochromic film nipped between the pair of conductive films, wherein said reflective film is a part of the electrochromic layer, serving as said rear conductive film.

2. The electrochromic anti-glare mirror of claim 1, further including a connector for connection to a power supply, connected to said other end of the conductor.

3. The electrochromic anti-glare mirror of claim 1, wherein the reflective film includes a rear surface opposite the electrochromic layer, the circuit board is disposed at the rear surface side and approximately parallel to the reflective film.

4. The electrochromic anti-glare mirror of claim 1, wherein a heater is provided between the reflective film and the circuit board, and the circuit board includes a conductor for supplying electric power to the heater.

5. The electrochromic anti-glare mirror of claim 1, further comprising a cover member, wherein the circuit board includes opposite sides, one side being proximate the reflective film, with the cover member provided at the other side of the circuit board.

6. The electrochromic anti-glare mirror of claim 5, further comprising a connector mounted to the cover member.

7. The electrochromic anti-glare mirror of claim 1, wherein the circuit board includes two types of conductors having polarities different from each other for supplying electric power to the electrochromic layer, and the electrochromic layer is formed in laminated configuration and includes opposite edges, with one of the two types of conductors connected to one edge, and the other type of the two types of conductors connected to the opposite edge.

8. The electrochromic anti-glare mirror of claim 1, wherein the circuit board includes two types of conductors having polarities different from each other for supplying electric power to the electrochromic layer, and the electrochromic layer is formed in laminated configuration and includes a periphery, with one of the two types of conductors connected to a set of plural locations spaced apart from one another along the periphery, and the other type of the two types of conductors connects to a location different from said set of the plural locations along the periphery.

9. The electrochromic anti-glare mirror of claim 1, further comprising a heater having ends, wherein the power supply and circuit board are connected via two types of wires whose polarities are different from each other, the circuit board including:
   (a) first electrode terminals connected to one of the two types of wires, the first electrode terminals consisting of an electrode terminal connected to a portion of the electrochromic layer and an electrode terminal connected to one end of the heater; and
   (b) second electrode terminals connected to the other of the two types of wires, the second electrode terminal consisting of an electrode terminal connected to another portion of the electrochromic layer and an electrode terminal connected to another end of the heater.

10. The electrochromic anti-glare mirror of claim 1, further comprising a transparent substrate disposed on a front side of the electrochromic layer, wherein the circuit board is electrically connected to the front transparent conductive film via a connecting terminal pressing the front transparent conductive film against the transparent substrate.

11. The electrochromic anti-glare mirror of claim 1, further comprising a transparent substrate disposed on a front side of the electrochromic layer, wherein the circuit board is electrically connected to the rear transparent conductive film via a connecting terminal pressing the rear transparent film against the transparent substrate.

12. The electrochromic anti-glare mirror of claim 1, wherein the electrochromic layer includes a periphery having connecting terminals provide there along, said connecting terminals connected to the circuit board through welded portions.

13. The electrochromic anti-glare mirror of claim 1, further comprising a substrate glass, a protective board, and an adhesive, with the substrate glass being disposed on the electrochromic layer, and the adhesive adhering the protective board to the reflective film, with the circuit board disposed on the protective board, wherein the substrate glass, protective board, electrochromic layer and circuit board are all approximately parallel to one another.

14. The electrochromic anti-glare mirror of claim 1, wherein said circuit board indirectly contacts said reflective film and electrochromic layer through a protective plate.

15. An electrochromic anti-glare mirror for electrically altering reflectance when connected to a power supply, said mirror comprising:
(a) a reflective film;
(b) an electrochromic layer disposed on a front side of the reflective film, through which light reflected from the reflective film passes, and whose color changes due to the electrochromic layer being energized; and
(c) a circuit board having a conductor with two ends, one end being connected to the electrochromic layer and the other end being for connection to a power supply,
wherein said reflective film, said electrochromic layer and said circuit board are disposed in direct or indirect close contact with each other,
wherein the circuit board includes two types of conductors having polarities different from each other for supplying electric power to the electrochromic layer, and a resistance for fail-safe disposed between the two types of conductors which discharges electrical power if there is a power supply malfunction.

16. An electrochromic anti-glare mirror comprising:
(a) a substrate glass having front and back surfaces;
(b) an electrochromic layer provided on the back surface of the substrate glass, the electrochromic layer including an electrochromic film disposed between a transparent conductive film and a reflective conductive film, wherein the electrochromic film alters color when subjected to an electric voltage via the transparent and reflective conductive film; and
(c) a printed circuit board on which circuitry is printed for applying an electric voltage to the electrochromic film, wherein said substrate glass, said electrochromic layer and said printed circuit board are disposed in direct or indirect close contact with each other.

17. The electrochromic anti-glare mirror of claim 16, further comprising a resistance for fail-safe printed on the printed circuit board, which discharges electric power between the transparent conductive film and the reflective conductive film when electric power is supplied to the electrochromic layer and there is a malfunction.

18. The electrochromic anti-glare mirror of claim 17, further comprising an electric heater having a pair of heater terminals, the heater being provided between the electrochromic layer and the printed circuit board, with the heater terminals connected directly to the printed circuit board.

19. The electrochromic anti-glare mirror of claim 16, wherein said circuit board indirectly contacts said electrochromic layer through a protective plate.

20. An electrochromic anti-glare mirror for electrically altering reflectance when connected to a power supply, the electrochromic anti-glare mirror comprising:
(a) a transparent substrate having a rear surface;
(b) a transparent conductive film having a rear surface, the transparent conductive film being disposed at the rear surface side of the transparent substrate;
(c) a reflective conductive film having a rear surface, the reflective conductive film being disposed at the rear surface side of the transparent conductive film;
(d) an electrochromic film disposed between the transparent conductive film and the reflective conductive film, and through which light reflected from the reflective conductive film passes to the transparent substrate, and whose color changes due to electrical energization thereof; and
(e) a circuit board disposed at the rear surface side of the reflective conductive film, the circuit board having a conductor with two ends, one end being connected to the electrochromic film, and the other end being for connection to a power supply,
wherein said transparent substrate, said transparent conductive film, said reflective conductive film, said electrochromic film and said circuit board are disposed in direct or indirect close contact with each other.

21. The electrochromic anti-glare mirror of claim 20, wherein the circuit board includes two types of conductors having polarities different from each other for supplying electric power to the electrochromic film, and a resistance for fail-safe disposed between the two types of conductors which discharges electrical power if there is malfunction in supplying power.

22. The electrochromic anti-glare mirror of claim 20, wherein said circuit board indirectly contacts said electrochromic layer through a protective plate.

23. An electrochromic anti-glare mirror for electrically altering reflectance when connected to a power supply, said mirror comprising:
(a) a reflective film;
(b) an electrochromic layer disposed on a front side of the reflective film, through which light reflected from the reflective film passes, and whose color changes due to the electrochromic layer being energized;
(c) a heater including a pair of terminals having different polarities;
(d) a circuit board having a conductor with two ends, one end being connected to the electrochromic layer and the other end being for connection to a power supply;
(e) a cover sheet which protects said circuit board, said cover sheet being provided with at least one metal plate disposed to correspond to the position of said one end of said conductor of said circuit board and at least one hole thereon so as to correspond to the position of said other end of said conductor of said circuit board;
(f) at least one terminal including a portion shaped in a substantial U-shape and a leg portion which protrudes from said substantially U-shaped portion; and
(g) an electrical connector that is connected to said power supply, wherein said cover sheet, said circuit board, said heater and said electrochromic layer are electrically conducted by connecting said leg portion of said terminal to said metal plate provided on said cover sheet, and disposing said electrical connector over said hole provided in said cover sheet, and having said reflective film, said electrochromic layer, said heater, said circuit board and said cover sheet disposed in direct or indirect close contact with each other.

24. The electrochromic anti-glare mirror of claim 14, wherein said circuit board directly contacts said reflective film and electrochromic layer through a conductive terminal that engages an outer edge of said electrochromic layer and reflective film.

* * * * *